United States Patent [19]

Hari et al.

[11] 4,093,613
[45] June 6, 1978

[54] TRISAZO PIGMENTS CONTAINING TWO BARBITURIC ACID COUPLING COMPONENTS

[75] Inventors: Stefan Hari, Allschwil; Armand Rouèche, Bottmingen, both of Switzerland

[73] Assignee: Ciba-Geigy Corporation, Ardsley, N.Y.

[21] Appl. No.: 706,369

[22] Filed: Jul. 19, 1976

[30] Foreign Application Priority Data

Jul. 31, 1975  Switzerland............... 10000/75

[51] Int. Cl.² .................................... C09B 35/00
[52] U.S. Cl. ................... 260/154; 260/205; 260/206; 260/207; 260/207.1; 260/208; 106/288 Q
[58] Field of Search ......................... 260/154

[56] References Cited

FOREIGN PATENT DOCUMENTS 2,434,432  6/1975  Germany .................. 260/154
2,209,444  9/1972  Germany .................. 260/154
  369,844  7/1963  Switzerland ............... 260/154

Primary Examiner—Charles F. Warren
Attorney, Agent, or Firm—Vincent J. Cavalieri

[57] ABSTRACT

Azo pigments of the formula

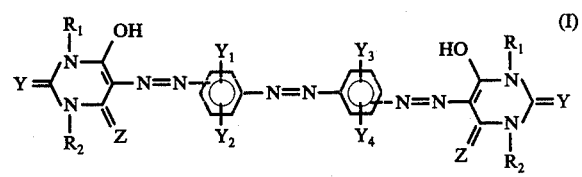

(I)

in which $R_1$ and $R_2$ denote H atoms, alkyl groups with 1-6 C atoms or aryl radicals, Y denotes an O or S atom or an imino group, Z denotes an O atom or an imino group and $Y_1$-$Y_4$ denote H or halogen atoms, alkyl or alkoxy groups containing 1-4 C atoms, or nitro, trifluoromethyl or alkoxycarbonyl groups containing 2-4 C atoms are valuable pigments coloring plastics, melts, spinning solutions, lacquers paints and printing inks in yellow to red shades of high tinctorial strength and excellent fastness properties.

8 Claims, No Drawings

TRISAZO PIGMENTS CONTAINING TWO BARBITURIC ACID COUPLING COMPONENTS

The present invention relates to valuable azo pigments of the formula

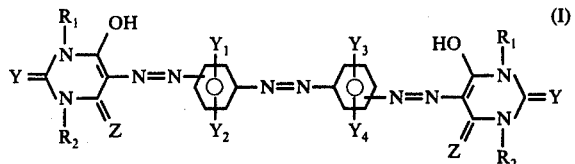

in which $R_1$ and $R_2$ denote H atoms, alkyl groups with 1-6 C atoms or aryl radicals, Y denotes an O or S atom or an imino group, Z denotes an O atom or an imino group and $Y_1$–$Y_4$ denote H or halogen atoms, alkyl or alkoxy groups containing 1-4 C atoms, or nitro, trifluoromethyl or alkoxycarbonyl groups containing 2-4 C atoms.

Particular interest attaches to the trisazo pigments of the formula

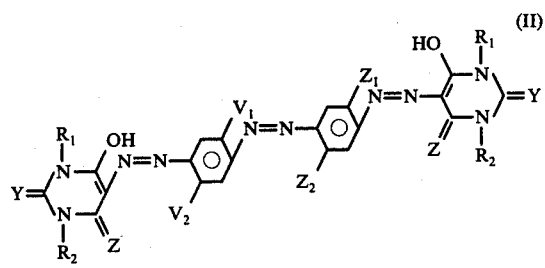

in which $V_1$, $V_2$, $Z_1$ and $Z_2$ denote H or halogen atoms or alkyl or alkoxy groups containing 1-2 C atoms and $R_1$, $R_2$, Y and Z have the abovementioned meaning, and especially to those of the formula

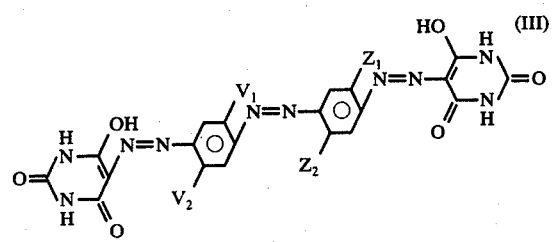

in which $V_1$, $V_2$, $Z_1$ and $Z_2$ have the abovementioned meaning.

The new colorants are obtained when the tetrazonium compound of a diamine of the formula

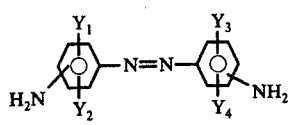

is coupled in the molar ratio of 1:2 with a compound of the formula

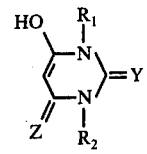

It is preferred to start from tetrazotised diamines of the formula

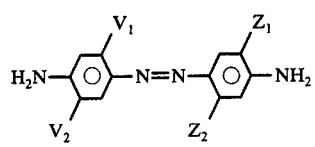

in which $V_1$, $V_2$, $Z_1$ and $Z_2$ have the indicated meaning.

The following diaminoazobenzenes may be mentioned as examples of tetrazo components: 4,4'-diaminoazobenzene, 2-chloro-4,4'-diaminoazobenzene, 3-chloro-4,4'-diaminoazobenzene, 2-methyl-4,4'-diaminoazobenzene, 3-methyl-4,4'-diaminoazobenzene, 2-methoxy-4,4'-diaminoazobenzene, 3-methoxy-4,4'-diaminoazobenzene, 2,5-dimethyl-4,4'-diaminoazobenzene, 2,3-dimethyl-4,4'-diaminoazobenzene, 5,2',5'-trimethyl-4,4'-diaminoazobenzene 2,5,2'-trimethyl-4,4'-diaminoazobenzene, 2,5,2',5'-tetramethyl-4,4'-diaminoazobenzene, 3-methyl-2'-methoxy-4,4'-diaminoazobenzene, 2-chloro-2'-methyl-4,4'-diaminoazobenzene, 3-chloro-2'-methyl-4,4'-diaminoazobenzene, 3-chloro-5,2'-dimethyl-4,4'-diaminoazobenzene, 2-chloro-5,2'-dimethyl-4,4'-diaminoazobenzene, 3-chloro-5,2'-dimethoxy-4,4'-diaminoazobenzene, 3-chloro-2',5'-diethoxy-4,4'-diaminoazobenzene, 2,5-dimethyl-2'-methoxy-4,4'-diaminoazobenzene, 2,5-dimethyl-2'-methyl-5'-methoxy-4,4'diaminoazobenzene, 2,5-dimethyl-2',5'-dimethoxy-4,4'-diaminoazobenzene, 2,5,2',5'-tetramethoxy-4,4'-diaminoazobenzene, 2,5,2',5'-tetraethoxy-4,4'-diaminoazobenzene, 2,5-diethoxy-2'-methoxy-4,4'-diaminoazobenzene, 2,5,5'-trimethoxy-2'-methyl-4,4'-diaminoazobenzene, 2-cyano-4,4'-diaminoazobenzene, 2-cyano-2'-methyl-4,4'-diaminoazobenzene, 2-cyano-2',5'-dimethyl-4,4'-diaminoazobenzene, 2-cyano-2'-methyl-5'-methoxy-4,4'-diaminoazobenZene, 2-cyano-2',5'-dimethoxy-4,4'-diaminoazobenzene, 2-trifluoromethyl-4,4'-diaminoazobenzene, 2-trifluoromethyl-2'-methyl-4,4'-diaminoazobenzene, 2-trifluoromethyl-2',5'-dimethyl-4,4'-diaminoazobenzene, 2-trifluoromethyl-2'-methyl-5'-methoxy-4,4'-diaminoazobenzene, 2-methylsulphonyl-4,4'-diaminoazobenzene, 2-methylsulphonyl-2'-methyl-4,4'-diaminoazobenzene, 2-methylsulphonyl-2',5'-dimethyl-4,4'-diaminoazobenzene, 2-methylsulphonyl-2'-methyl-5'-methoxy-4,4'-diaminoazobenzene, 4-chloro-3,4'-diaminoazobenzene, 2-chloro-4,3'-diaminoazobenzene, 2-methyl-4,3'-diaminoazobenzene and 2-methoxy-4,3'-diaminoazobenzene.

The diaminoazobenzenes mentioned are known compounds which are obtained, for example, by coupling the diazo compound of a monoacylated diaminobenzene with an aminobenzene and deacylating the resulting azo dyestuff, or by coupling the diazo compound of a nitroaniline with an aminobenzene and reducing the nitro group in the resulting azo dyestuff.

In the barbituric acids of the formula (V) to be used as coupling components, Y and Z preferably denote O atoms and $R_1$ and $R_2$ preferably denote H atoms. Barbituric acids in which $R_1$ and $R_2$ denote alkyl groups, especially methyl groups, and barbituric acids in which $R_1$ denotes a methyl group and $R_2$ denotes a phenyl radical which is optionally substituted by chlorine atoms, alkyl or alkoxy groups containing 1-4 C atoms or nitro groups are also preferred. The following compounds may be mentioned as derivatives of barbituric acid:

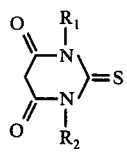 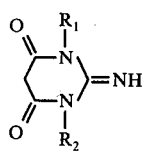 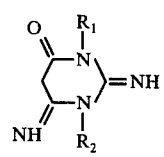

2-Thiobarbituric acids    2-Iminobarbituric acids    2,4-Diimino-barbituric acids The barbituric acid derivatives mentioned are known compounds.

Coupling is advantageously effected by gradually adding the diazonium solution to the aqueous solution of the coupling component at a pH value of 4-6.

The pH value is advantageously adjusted by adding a buffer. Examples of suitable buffers are the salts, especially the alkali metal salts, of formic acid, phosphoric acid or acetic acid. Furthermore, the coupling solution can contain wetting agents, dispersing agents or emulsifiers, for example an aralkylsulphonate, such as a dodecylbenzenesulphonate, polycondensation products of ethylene oxides, such as the reaction product of ethylene oxide with p-tert.-octylphenol, and alkyl esters of sulphoricinoleates, for example n-butyl sulphoricinoleate. The coupling dispersion can also advantageously contain protective colloids, for example methylcellulose or minor amounts of inert organic solvents which are sparingly soluble or insoluble in water, for example halogenated or nitrated aromatic hydrocarbons, such as benzene, toluene, xylene, chlorobenzene, dichlorobenzene or nitrobenzene, as well as aliphatic halogenohydrocarbons, such as, for example, carbon tetrachloride or trichloroethylene, and also water-miscible organic solvents such as acetone, methyl ethyl ketone, methanol, ethanol or isopropanol, as well as dimethylformamide.

By virtue of their insolubility, the pigments obtained can be isolated from the reaction mixtures by filtration. In most cases, these pigments have an excellent texture after drying. In certain cases it proves advantageous to subject the resulting pigments to an after-treatment with an organic solvent which preferably boils above 100° C. Particularly suitable solvents prove to be benzene derivatives substituted by halogen atoms or alkyl or nitro groups, such as xylenes, chlorobenzene, o-dichlorobenzene or nitrobenzene, as well as pyridine bases, such as pyridine, picoline or quinoline, and also ketones, such as cyclohexanone, ethers, such as ethylene glycol monomethyl ether or monoethyl ether, amides such as dimethylformamide or N-methylpyrrolidone, and also dimethylsulphoxide and water under pressure.

The after-treatment is preferably carried out by heating the pigment, in the solvent, to 100°-150° C, under normal or elevated pressure, whereupon, in many cases, a coarsening of the particle size occurs, which has an advantageous effect on the fastness to light and to migration and on the opacity of the resulting pigments.

The coupling can also advantageously be carried out by continuously combining an acid solution of the tetrazonium salt with an alkaline solution of the coupling component in a mixing nozzle, whereupon immediate coupling of the components takes place. The resulting dyestuff dispersion is continuously withdrawn from the mixing nozzle and the dyestuff is isolated by filtration.

The coupling can also be carried out by suspending the diamine to be tetrazotised, and the coupling component, in the molar ratio of 1:2, in an organic solvent, and treating the mixture with a diazotising agent, especially an ester of nitrous acid, such as methyl nitrite, ethyl nitrite, butyl nitrite, amyl nitrite or octyl nitrite.

The new colorants are valuable pigments which can be used, in a finely divided form, for pigmenting high-molecular organic material, for example cellulose ethers and esters, such as ethylcellulose, nitrocellulose, cellulose acetate and cellulose butyrate, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, polyamides, polyurethanes or polyesters, rubber, casein, silicone and silicone resins, individually or as mixtures.

It is immaterial whether the high-molecular compounds mentioned are in the form of plastic masses or melts or in the form of spinning solutions, lacquers or paints. Depending on their end use, it proves advantageous to use the new pigments as toners or in the form of preparations.

The new colorants are distinguished by good fastness to light, migration and overlacquering, and by very good heat resistance. Because of their high tinctorial strength and transparency they are particularly suitable for use in printing inks for letterpress printing, gravure printing and offset printing.

In relation to the nearest comparable colorants, such as are described in DT-OS 2,434,432, the colorants according to the invention are distinguished by increased tinctorial strength and better fastness to light.

In the examples which follow the parts, unless stated otherwise, denote parts by weight, the percentages denote percentages by weight and the temperatures are given in degrees Centigrade.

EXAMPLE 1

9.1 parts of 4,4'-diamino-2-methyl-azobenzene are dissolved in 300 parts by volume of glacial acetic acid at 35°. The violet solution is stirred with 20 parts by volume of concentrated hydrochloric acid. The resulting thick, pink suspension (hydrochloride) is diluted with 60 parts of water and cooled to 5°, then 20.2 parts by volume of 4 N sodium nitrite solution are added dropwise over the course of 20 minutes at 5°, and the resulting brown tetrazo solution is clarified by filtration.

Thereafter, 10.4 parts of barbituric acid are dissolved in 240 parts of water by the use of 40 parts by volume of 30% strength sodium hydroxide solution. The tetrazo solution is added dropwise to this colourless solution at 5° over the course of 40 minutes. A red precipitate hereupon forms. The resulting suspension is adjusted to a pH value of 5 by adding 192 parts by volume of 30% strength aqueous sodium hydroxide solution. It is stirred for 3 hours at a temperature rising to 22° and is then heated to 75° over the course of one hour, and filtered hot. The residue is washed free from salt and is dried in vacuo at 60°. 20 parts, corresponding to 99% of theory, of a dark violet powder of the formula

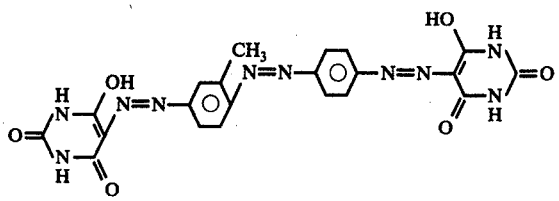

are obtained.

If this pigment is after-treated in dimethylsulphoxide (1 hour at 162°) and then milled into polyvinyl chloride, fast, very intense red colorations are obtained. Polyester resins are also coloured by this pigment in pure, very intense and fast red shades.

Analysis: Calculated: C 50.00; H 3.20; N 27.77%; Found: C 49.6; H 3.3; N 27.3%.

The table which follows describes further colorants which are obtained by coupling the tetrazotised bases of column I with the coupling components of column II. Column III indicates the colour shade of the PVC sheet coloured with 0.1% of these pigments.

filtered. The filter residue is washed with water until neutral and is dried in vacuo at 60°. The product is a beige powder which melts between 286° and 290°, with decomposition. The yield is 39.4 parts (70% of theory).

Analysis: Calculated: C 64.85; H 5.44; N 18.91%; Found: C 64.7; H 5.5; N 18.8%.

(b) 4,4'-diaminoazobenzene

A suspension of 35 parts of 4,4'-diacetamino-azobenzene in 315 parts by volume of methanol and 315 parts by volume of 2 N hydrochloric acid is heated to 74°, stirred for 90 minutes at this temperature and cooled to 18°, and the product is filtered off. The 4,4'-diaminoazobenzene dihydrochloride thus obtained is pressed out well and is suspended, without being washed, in 1,000 parts of water. The new suspension is stirred for 15 minutes at room temperature, about 300 parts by volume of 2.5 N sodium hydroxide solution are added dropwise (pH = 7) and the mixture is filtered. The residue is washed free from salt and is dried in vacuo at 60°. 24.6 parts (98.5% of theory) of an ochre-yellow powder are obtained. Melting point: 236°–238°, with decomposition.

Analysis: Calculated: C 64.85; H 5.44; N 18.91%; Found: C 64.7; H 5.5; N 18.8%.

TABLE I

| Example | I | II | III |
|---|---|---|---|
| 2 | 4,4'-diamino-2-methyl-azobenzene | 2-thiobarbituric acid | brown |
| 3 | 4,4'-diamino-2-methyl-azobenzene | 2-iminobarbituric acid | brown |
| 4 | 4,4'-diamino-2-methoxy-azobenzene | barbituric acid | bluish-tinged red |
| 5 | 4,4'-diamino-2-methoxy-azobenzene | 2-thiobarbituric acid | violet |
| 6 | 4,4'-diamino-2-methoxy-5-methyl-azobenzene | barbituric acid | violet |
| 7 | 4,4'-diamino-3-methyl-3',6'-dimethoxy-azobenzene | barbituric acid | violet |
| 8 | 4,4'-diamino-3-chloro-3',6'-dimethyl-azobenzene | barbituric acid | red |
| 9 | 4,4'-diamino-3',2'-dimethoxy-azobenzene | barbituric acid | violet |
| 10 | 4,4'-diamino-3',6'-dimethyl-azobenzene | barbituric acid | red |
| 11 | 4,4'-diamino-3-chloro-2'-methoxy azobenzene | barbituric acid | claret |
| 12 | 4,4'-diamino-2-methyl-azobenzene | 1,3-dimethyl-barbituric acid | scarlet |
| 13 | 4,4'-diamino-2-methyl-azobenzene | 1-phenyl-barbituric acid | brownish-tinged red |
| 14 | 4,4'-diamino-2-methyl-azobenzene | 2,4-diimino-barbituric acid | dark brown |
| 15 | 4,4'-diamino-2-methyl-azobenzene | 1-methyl-3-(3'-chloro-phenyl)-barbituric acid | red |
| 16 | 4,4'-diamino-3,3'-dichloro-azobenzene | barbituric acid | red |
| 17 | 4,4'-diamino-2-methoxy-azobenzene | 2-imino-barbituric acid | dark brown |
| 18 | 4,4'-diamino-2-methoxy-azobenzene | 1,3-dimethyl-barbituric acid | red |
| 19 | 4,4'-diamino-3,3'-dimethyl-azobenzene | barbituric acid | violet-tinged red |
| 20 | 4,4'-diamino-3,3'-dimethyl-azobenzene | 1,3-dimethyl-barbituric acid | orange |
| 21 | 4,4'-diamino-3,3'-dimethyl-azobenzene | 2-imino-barbituric acid | claret |
| 22 | 4,4'-diamino-3-chloro-2'-methoxy-azobenzene | 1,3-dimethyl-barbituric acid | red |
| 23 | 4,4'-diaminoazobenzene | 1,3-dimethyl-barbituric acid | orange |
| 24 | 3,3'-diaminoazobenzene | barbituric acid | yellow |
| 25 | 3,3'-diaminoazobenzene | 1,3-dimethyl-barbituric acid | yellow |
| 26 | 4,3'-diamino-2-methyl-azobenzene | barbituric acid | orange |
| 27 | 4,3'-diamino-2-methyl-azobenzene | 1,3-dimethyl-barbituric acid | yellowish-tinged orange |

4,4'-Diaminoazobenzene can be prepared as follows:

(a) 4,4'-diacetamino-azobenzene 69 parts of 82% pure 4-aminoacetanilide, 80 parts of sodium perborate and 20 parts of boric acid in 1,000 parts by volume of glacial acetic acid are stirred at room temperature. After 5 minutes, a violet solution is produced, which is heated to 60°. At this temperature, an exothermic reaction takes place, and the temperature rises, without heating, to 70°. A beige precipitate separates out. The suspension thus obtained is stirred for a further 6 hours at 60° and is then cooled to 20° and

EXAMPLE 28

The moist filter residue obtained according to Example 1 is stirred into 800 parts by volume of DMF and is dehydrated azeotropically in 6 hours, at a temperature rising to 136°. A red-orange pigment is obtained, which colours polyvinyl chloride and polyester resins in orange, fast shades.

Analysis: Calculated: C 50.00; H 3.20; N 27.77%; Found: C 49.9; H 3.3; N 27.5%.

EXAMPLE 29

65 parts of stabilised polyvinyl chloride, 35 parts of dioctyl phthalate and 0.2 part of the pigment obtained according to Example 1 are stirred together and the mixture is then milled on a twin-roll calender for 7 minutes at 140°. A red-coloured sheet having very good fastness to light and to migration is obtained.

EXAMPLE 30

1.00 g of the pigment prepared according to Example 1 is ground finely with 4.00 g of a print varnish composed of 29.4% of linseed oil/stand oil (300 poise), 67.2% of linseed oil/stand oil (20 poise), 2.1% of cobalt octoate (8% of Co) and 1.3% of lead octoate (24% of Pb) on an Engelsmann grinder, and the mixture is then printed by means of a block, using the letterpress process, onto art printing paper, applying 1 g/m². An intense pure red shade of good transparency and good gloss is obtained.

The pigment is also suitable for other printing processes, such as gravure printing, offset printing and flexographic printing, and here again gives very good results.

What is claimed is:

1. An azo pigment of the formula

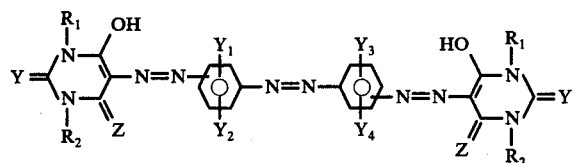

in which $R_1$ and $R_2$ denote H, alkyl with 1-6 C atoms or aryl, Y denotes an O, S or imino, Z denotes O or imino and $Y_1-Y_4$ denote H, halogen, alkyl containing 1-4 C atoms, alkoxy containing 1-4 C atoms, nitro, trifluoromethyl or alkoxycarbonyl containing 2-4 C atoms.

2. A tris-azo pigment according to claim 1, of the formula

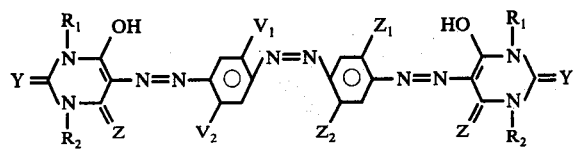

in which $V_1$, $V_2$, $Z_1$ and $Z_2$ denote H, halogen, alkyl containing 1-2 C atoms, or alkoxy containing 1-2 C atoms and $R_1$, $R_2$, Y and Z have the meaning indicated in claim 1.

3. A tris-azo pigment according to claim 2, of the formula

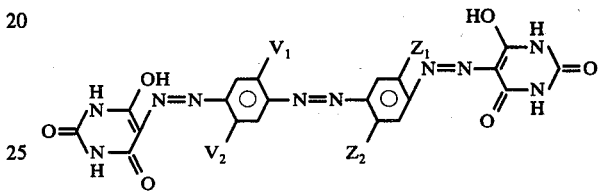

in which $V_1$, $V_2$, $Z_1$ and $Z_2$ have the meaning indicated in claim 2.

4. The azo pigment according to claim 1 of the formula

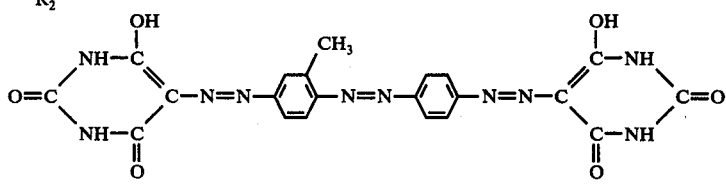

5. The azo pigment according to claim 1 of the formula

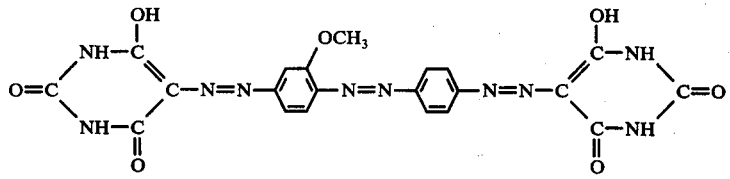

6. The azo pigment according to claim 1 of the formula

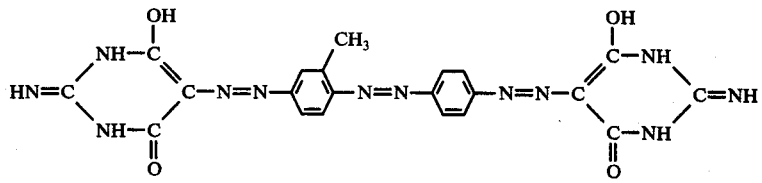

7. The azo pigment according to claim 1 of the formula

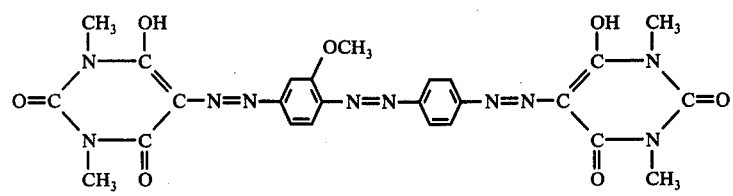
8. The azo pigment according to claim 1 of the formula
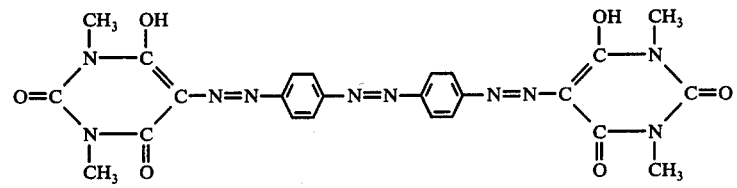
* * * * *